United States Patent
Zhou

(10) Patent No.: US 10,955,239 B2
(45) Date of Patent: Mar. 23, 2021

(54) POSITIONING DEVICE AND POSITIONING METHOD, COLOR FILM COATING MACHINE

(71) Applicant: Shenzhen China Star Optoelectronics Semiconductor Display Technology Co., Ltd., Guangdong (CN)

(72) Inventor: Wenhui Zhou, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 451 days.

(21) Appl. No.: 15/750,436

(22) PCT Filed: Aug. 9, 2017

(86) PCT No.: PCT/CN2017/096552
§ 371 (c)(1),
(2) Date: Feb. 5, 2018

(87) PCT Pub. No.: WO2019/014984
PCT Pub. Date: Jan. 24, 2019

(65) Prior Publication Data
US 2019/0017818 A1    Jan. 17, 2019

(30) Foreign Application Priority Data

Jul. 17, 2017    (CN) .......................... 201710583040.7

(51) Int. Cl.
*G01B 21/04* (2006.01)
*B05B 12/12* (2006.01)
(Continued)

(52) U.S. Cl.
CPC .......... *G01B 21/047* (2013.01); *B05B 12/122* (2013.01); *B05C 11/00* (2013.01);
(Continued)

(58) Field of Classification Search
USPC ....................................... 414/754; 356/237.1
See application file for complete search history.

(56) References Cited

U.S. PATENT DOCUMENTS 3,630,389 A * 12/1971 Schmidt ..................... B25J 3/04
414/4
5,917,935 A * 6/1999 Hawthorne ........... G02F 1/1303
348/126
(Continued)

FOREIGN PATENT DOCUMENTS

CN    1221500 A    6/1999
CN    1221500 A    1/2007
(Continued)

*Primary Examiner* — Lynn E Schwenning
(74) *Attorney, Agent, or Firm* — Leong C. Lei

(57) ABSTRACT

The present disclosure provides a positioning device, including a laser projector, and a servo system for driving the laser projector and collecting a coordinate data. The present disclosure further provides a positioning method and a color film coating machine, including a warehouse and a marble platform arranged in the warehouse, wherein further includes a positioning device, the positioning device includes a laser projector and a servo system for driving the laser projector and collecting a coordinate data, a projection direction of the laser projector is opposite to a surface of the marble platform. Compared with the prior art, by knowing the current position of the laser projector to output the corresponding coordinates, the corresponding target foreign objects can be quickly found on the marble platform according to the coordinates, cleared in time, the inspection time is saved, and the product yield is improved.

7 Claims, 3 Drawing Sheets

(51) Int. Cl.
*G01C 15/00* (2006.01)
*B05C 11/00* (2006.01)
*G01B 11/00* (2006.01)

(52) U.S. Cl.
CPC .......... *G01B 11/002* (2013.01); *G01C 15/002* (2013.01); *G01C 15/004* (2013.01)

(56) References Cited

U.S. PATENT DOCUMENTS

| | | | | |
|---|---|---|---|---|
| 2003/0160923 | A1* | 8/2003 | Ma | G02F 1/13718 349/115 |
| 2009/0028423 | A1* | 1/2009 | Sandstrom | G03F 1/84 382/149 |
| 2010/0290027 | A1 | 11/2010 | Lin | |

FOREIGN PATENT DOCUMENTS

| | | | | |
|---|---|---|---|---|
| CN | 102012571 | A | 4/2011 | |
| CN | 202124565 | U | 1/2012 | |
| CN | 102975375 | * | 3/2013 | ............. B29C 70/38 |
| CN | 102975375 | A | 3/2013 | |
| CN | 103101060 | A | 5/2013 | |
| CN | 104298244 | A | 1/2015 | |
| CN | 104808213 | * | 7/2015 | ............. G01S 17/02 |
| CN | 104808213 | A | 7/2015 | |
| CN | 105527656 | A | 4/2016 | |
| JP | 2005265832 | A | 9/2005 | |
| JP | 2006-110488 | A | 4/2006 | |
| JP | 2007-173387 | A | 7/2007 | |

\* cited by examiner

POSITIONING DEVICE AND POSITIONING METHOD, COLOR FILM COATING MACHINE

RELATED APPLICATIONS

The present application is a National Phase of International Application Number PCT/CN2017/096552, filed Aug. 9, 2017, and claims the priority of China Application No. 201710583040.7, filed Jul. 17, 2017.

FIELD OF THE DISCLOSURE

The present disclosure relates to a detection technique, and more particularly to a positioning device and a positioning method, and a color film coating machine.

BACKGROUND OF THE DISCLOSURE

In the flat panel display manufacturing industry, dust from foreign bodies is an important issue affecting production. In the production process, when a piece of dust falls on the marble platform of the color film coating machine, the produced product will have a poor quality resulting from the so-called defect of Mura, which refers to defects of images displayed on a display panel in various forms of unevenness. Once a Mura defect is detected on a display panel by an inspection machine according to the coordinates provided by the inspection machine, an operator will carry out certain processes to clean the marble platform of the coating machine in order to remove a particle dust from the marble platform, and afterwards, the operation of the coating machine is resumed, and production of defect products can be terminated. With the size of the display panel getting larger generation by generation, the size of the marble platform of the coating machine is also getting larger. In an area as large as a room, how to locate and remove the particle dust precisely and quickly is the key to maintaining efficient production.

Therefore, the color film coating machine is generally attached to the edge of the marble platform with a graduated scale, engineers in the X-scale and Y-scale to provide reference to estimate the location of dust particles, and then clean it; as the scale is attached to the edge of the marble platform, when the coordinates of the target foreign objects in the marble platform around the edge position, you can lock the target within a relatively small error. However, when the target foreign object is far away from the surrounding edge of the marble platform, the error of the human eye and the error caused by the engineer moving up the marble platform can not accurately locate the coordinates of the target foreign object, thus extending the inspection and clearance time.

SUMMARY OF THE DISCLOSURE

In order to overcome the deficiencies of the prior art, the present disclosure provides a positioning device and a positioning method, and a color film coating machine, which can quickly and accurately locate a target foreign object, thereby saving inspection time and reducing the defect rate of the product.

The present disclosure provides a positioning device, including a laser projector, and a servo system for driving the laser projector and collecting a coordinate data.

Wherein the servo system includes at least two servo motors for driving the laser projector to rotate spherical coordinates and a servo driver connected with the servo motor for controlling a rotation angle of the servo motor and an output of the coordinate data, one of the two servo motors is configured to drive the laser projector for rotating in a horizontal direction while the other servo motor is configured to drive the laser projector for rotating in a vertical direction, the servo motor for driving the laser projector to rotate in the vertical direction is fixed on an output shaft of the servo motor for driving the laser projector to rotate in the horizontal direction, the laser projector is fixed on the output shaft of the servo motor for driving the laser projector to rotate in the vertical direction.

Wherein the servo system includes a servo motor for driving the laser projector to rotate in a vertical direction, a linear motor for driving the laser projector to move in a horizontal direction, and a servo driver connected to the servo motor and the linear motor, the servo driver is configured to controlling a rotation angle of the servo motor, a moving distance of the linear motor and an output of the coordinate data, the servo motor is fixed on the linear motor, an axis of the servo motor is parallel to the linear motor, the laser projector is fixed on an output shaft of the servo motor.

Wherein the servo system further includes a computer for connecting with the servo driver to realize a display of the coordinate data and an input of the coordinate data.

The present disclosure further provides a positioning method, including a laser projector, wherein the positioning method includes:
establishing a spherical coordinate system by using the laser projector as a center of a sphere;
establishing a planar Cartesian coordinate system;
corresponding an origin coordinate of the spherical coordinate system to an origin coordinate of the planar Cartesian coordinate system, and corresponding one-to-one coordinates of the spherical coordinate system and the planar Cartesian coordinate system;
acquiring a spherical coordinate of a projection point of the laser projector and converting the spherical coordinate system and the Cartesian coordinate system to acquire a Cartesian coordinate corresponding to the projection point of the laser projector, and extracting values of x and y in Cartesian coordinate so as to obtain a coordinate in the planar Cartesian coordinate system where the projection point of the laser projector is located.

The present disclosure further provides another positioning method, including a laser projector, wherein the positioning method includes:
establishing a cylindrical coordinate system with a vertical axis where the laser projector is located as a Z axis;
establishing a planar Cartesian coordinate system;
corresponding an origin coordinate of the cylindrical coordinate system to an origin coordinate of the planar Cartesian coordinate system, and corresponding one-to-one coordinates of the cylindrical coordinate system and the planar Cartesian coordinate system;
acquiring a cylindrical coordinate of a projection point of the laser projector and converting the cylindrical coordinate system and the Cartesian coordinate system to acquire a Cartesian coordinate corresponding to the projection point of the laser projector, and extracting values of x and y in Cartesian coordinate so as to obtain a coordinate in the planar Cartesian coordinate system where the projection point of the laser projector is located.

The present disclosure further provides a color film coating machine, including a warehouse and a marble platform arranged in the warehouse, and further including a positioning device, wherein the positioning device includes a laser projector and a servo system for driving the laser projector and collecting a coordinate data; the laser projector is arranged on an inner top of the warehouse, and a projection direction of the laser projector is opposite to a surface of the marble platform.

Wherein the servo system includes at least two servo motors for driving the laser projector to rotate spherical coordinates and a servo driver connected with the servo motor for controlling a rotation angle of the servo motor and an output of the coordinate data, one of the two servo motors is configured to drive the laser projector for rotating in a horizontal direction while the other servo motor is configured to drive the laser projector for rotating in a vertical direction, the servo motor for driving the laser projector to rotate in the vertical direction is fixed on an output shaft of the servo motor for driving the laser projector to rotate in the horizontal direction, the servo motor for driving the laser projector to rotate in the horizontal direction is fixed on the inner top of the warehouse by a bracket, the laser projector is fixed on the output shaft of the servo motor for driving the laser projector to rotate in the vertical direction.

Wherein the servo system includes a servo motor for driving the laser projector to rotate in a vertical direction, a linear motor for driving the laser projector to move in a horizontal direction, and a servo driver connected to the servo motor and the linear motor, the servo driver is configured to controlling a rotation angle of the servo motor, a moving distance of the linear motor and an output of the coordinate data, the servo motor is fixed on the linear motor, an axis of the servo motor is parallel to the linear motor, the laser projector is fixed on an output shaft of the servo motor.

Wherein the servo system further includes a computer for connecting with the servo driver to realize a display of the coordinate data and an input of the coordinate data.

Compared with the prior art, the disclosure provides a laser projector and a servo system connected with the laser projector, by knowing the current position of the laser projector to output the corresponding coordinates, the corresponding target foreign objects can be quickly found on the marble platform according to the coordinates, cleared in time, the inspection time is saved, and the product yield is improved.

DETAILED DESCRIPTION OF PREFERRED EMBODIMENTS

The present disclosure will be further described in detail below with reference to the accompanying drawings and embodiments.

Figure 1:
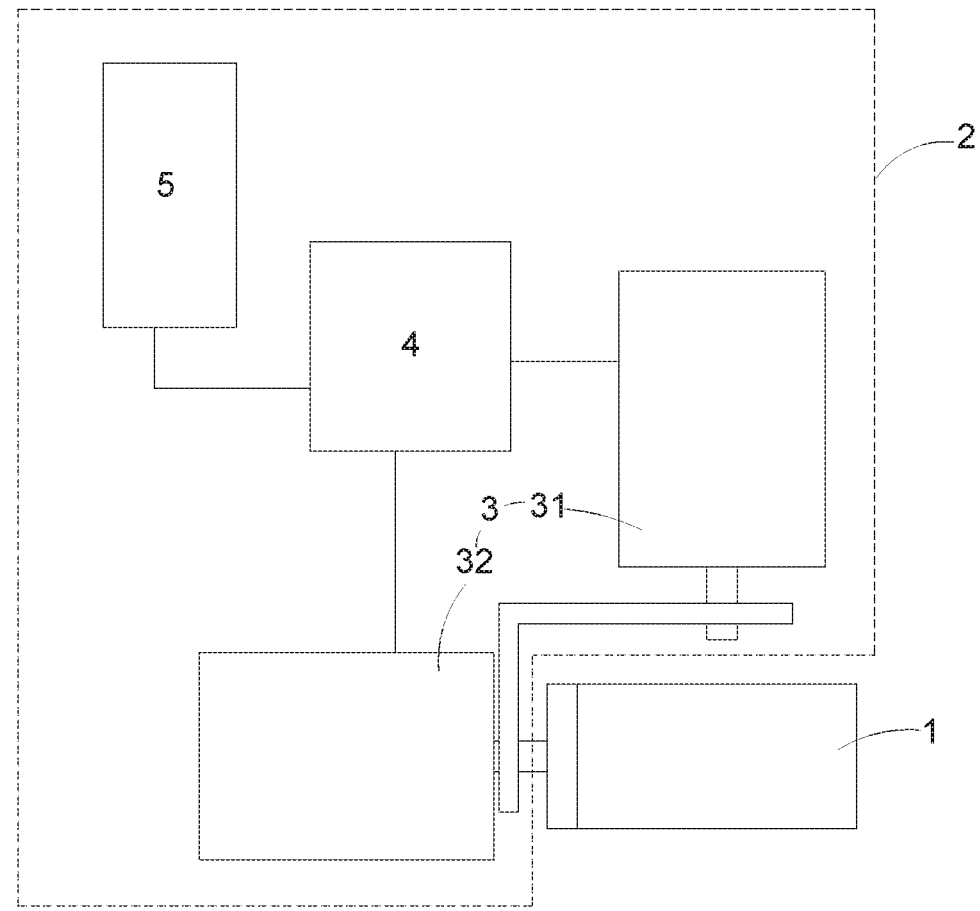
FIG. 1 is a schematic structural diagram of the first positioning device of the present disclosure.

As shown in FIG. 1, the positioning device of the present disclosure includes a laser projector 1 and a servo system 2 for driving the laser projector 1 and collecting a coordinate data.

In the present disclosure, the servo system 2 can be implemented in two ways. The structure of the servo system 2 will be described in detail below.

As shown in FIG. 1, in the positioning device of Embodiment 1, the servo system 2 includes at least two servo motors 3 for driving the laser projector 1 to rotate spherical coordinates, the servo driver 4 connected to the servo motor 3, and the computer 5 connected to the servo driver 4. The servo driver 4 is used for controlling the rotation angle of the servo motor 3 and the output of coordinate data. In the present embodiment, two servo motors 3 are provided, namely a first servo motor 31, and a second servo motor 32. The first servo motor 31 is configured to drive the laser projector 1 to rotate in a horizontal direction, the second servo motor 32 is configured to drive the laser projector 1 to rotate in a vertical direction, the second servo motor 32 is connected to the output shaft of the first servo motor 31 through a bracket, the axis of the second servo motor 32 is perpendicular to the axis of the first servo motor 31, The laser projector 1 is fixed on the output shaft of the second servo motor 32. the computer 5 is connected to the servo driver 4 to display the coordinate data sent from the servo driver 4 and input the coordinate data, so that the servo driver 4 drives the servo motor 3 to rotate according to the input coordinate data to finally project the projection point of the laser projector 1 onto the corresponding coordinate.

Figure 3:
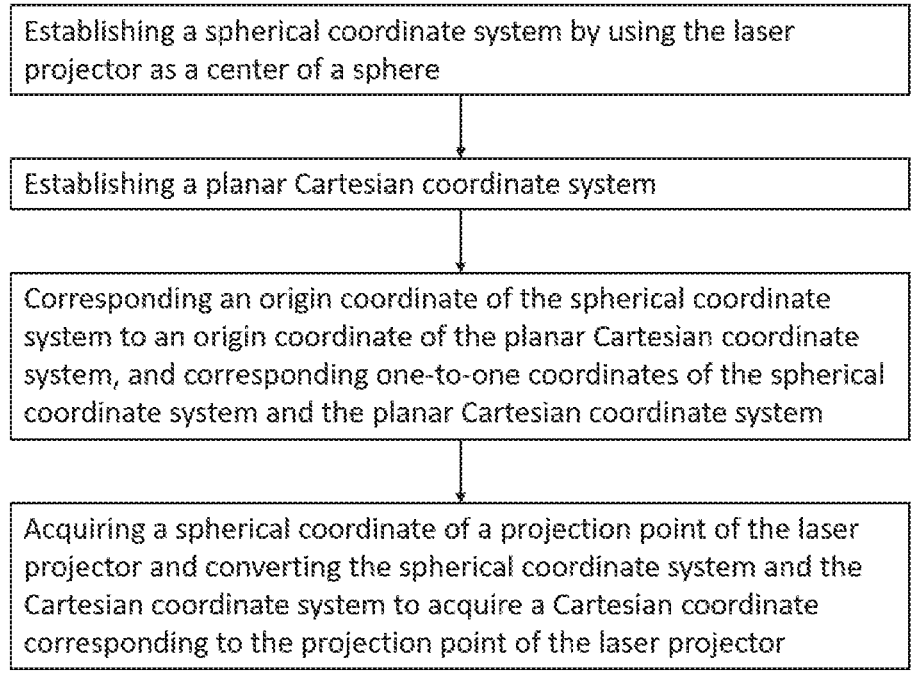
FIG. 3 is a flow chart of the first positioning method of the present disclosure.

The first positioning method of the present disclosure, in combination with Embodiment 1, as shown in FIG. 3, has the following steps:

establishing a spherical coordinate system (r, θ, φ) by using the laser projector 1 as a center of a sphere;

establishing a planar Cartesian coordinate system (x, y);

corresponding an origin coordinate of the spherical coordinate system to an origin coordinate of the planar Cartesian coordinate system, and corresponding one-to-one coordinates of the spherical coordinate system and the planar Cartesian coordinate system;

acquiring the spherical coordinate of the projection point of the laser projector 1 through the rotation angles of the two servo motors 3, converting the spherical coordinate system and the Cartesian coordinate system to obtain the Cartesian coordinate (x, y, z) corresponding to the projection point of the laser projector 1, and extracting values of x and y in Cartesian coordinate so as to obtain a coordinate (x, y) in the planar Cartesian coordinate system where the projection point of the laser projector 1 is located. It is noteworthy here that, the spherical coordinates of the projection point of the laser projector 1 can be determined by obtaining the rotation angle of the servo motor 3, the conversion of the spherical coordinate system and the Cartesian coordinate system can be obtained by using the prior art conversion formula: $x=r \sin θ \cos φ$; $y=r \sin θ \sin φ$; $z=r \cos θ$, which will not be elaborated here.

Figure 2:
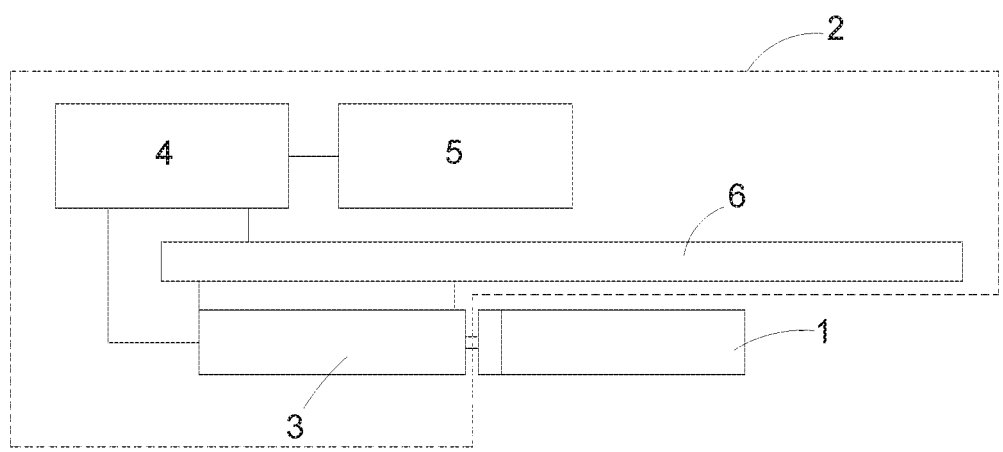
FIG. 2 is a schematic structural diagram of the second positioning device of the present disclosure.

As shown in FIG. 2, in the positioning device of Embodiment 2, the servo system 2 includes a servo motor 3 for driving the laser projector 1 to rotate in the vertical direction, a linear motor 6 for driving the laser projector 1 to move in the horizontal direction, a servo driver 4 connected to the servo motor 3 and the linear motor 6, a computer 5 connected to the servo driver 4. The servo motor 3 is fixed to the mover of the linear motor 6 through a bracket, the axis of the servo motor 3 is parallel to the linear motor 6, the laser projector 1 is fixed on the output shaft of the servo motor 3, the servo driver 4 is used to control the rotation angle of the servo motor 3, the moving distance of the linear motor 6 and the output of coordinate data, the computer 5 is connected with the servo driver 4 to realize the display of the coordinate data sent by the servo driver 4 and the input of the coordinate data, so that the servo driver 4 drives the servo motor 3 to rotate and the linear motor 6 to move according to the input coordinate data to finally project the projection point of the laser projector 1 onto the corresponding coordinate.

Figure 4:
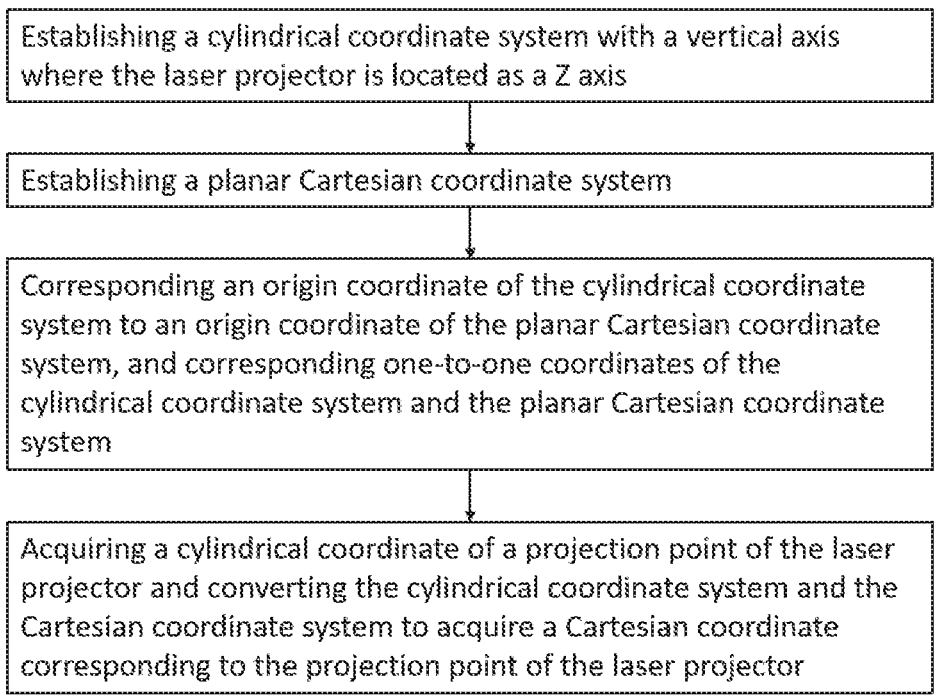
FIG. 4 is a flow chart of the second positioning method of the present disclosure.

The second positioning method of the present disclosure, in combination with Embodiment 2, as shown in FIG. 4, has the following steps: establishing a cylindrical coordinate system (r, θ, z) with a vertical axis where the laser projector 1 is located as a Z axis; establishing a planar Cartesian coordinate system (x, y); corresponding an origin coordinate of the cylindrical coordinate system to an origin coordinate of the planar Cartesian coordinate system, and corresponding one-to-one coordinates of the cylindrical coordinate system and the planar Cartesian coordinate system; acquiring the cylindrical coordinate of the projection point of the laser projector 1 by the moving distance of the linear motor 6 and the rotation angle of the servo motor 3, converting between the cylindrical coordinate system and the Cartesian coordinate system to obtain the Cartesian coordinate (x, y, z) corresponding to the projection point of the laser projector 1, and extracting the values of x and y in the Cartesian coordinates to obtain the coordinates (x, y) in the planar coordinate system where the projection point of the laser projector 1 is located. It is worth noting here that the cylindrical coordinates of the projection point of the laser projector 1 can be determined by obtaining the position of the linear motor 6 and the rotation angle of the servo motor 3, the conversion between the cylindrical coordinate system and the Cartesian coordinate system can be obtained by using the prior art conversion formula: x=r cos θ; y=r sin θ; z=z, which will not be elaborated here.

Figure 5:
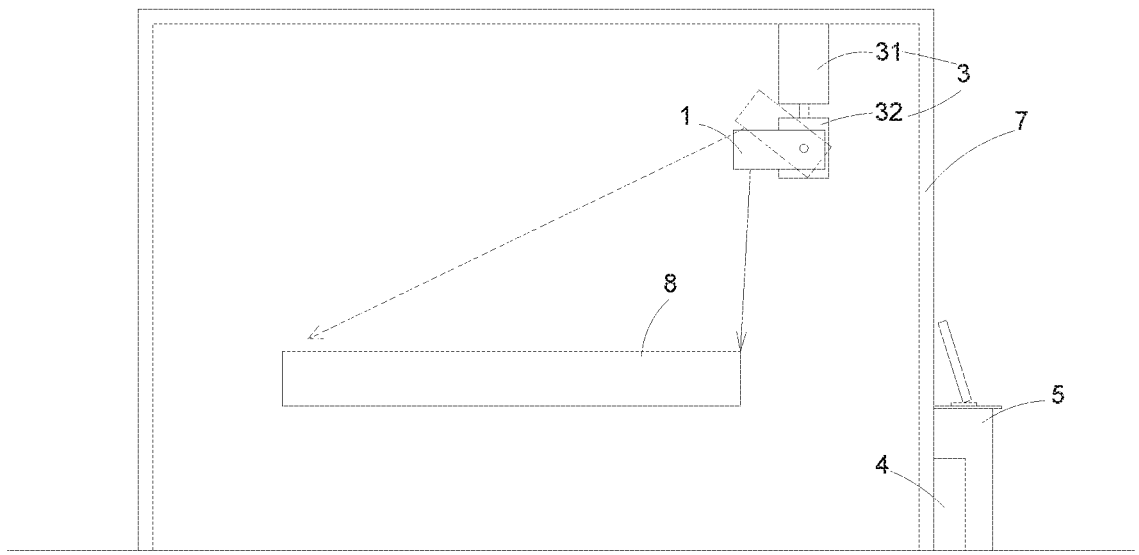
FIG. 5 is a schematic structural diagram of the first positioning device of the present disclosure installed in a color film coating machine.

As shown in FIG. 5, the first color film coating machine of the present disclosure includes a warehouse 7, a marble platform 8 arranged in the warehouse 7, and a positioning device in Embodiment 1. The laser projector 1 is arranged on the inner top of the warehouse 7. The first servo motor 31 is fixed on the inner top of the warehouse 7 by a bracket. The laser projector 1 is fixed on the output shaft of the second servo motor 32, the projection direction of the laser projector 1 is opposite to the surface of the marble platform 8, the axis of the first servo motor 31, which is shown extending vertically in the drawings sheet of FIG. 5, is perpendicular to the surface of the marble platform 8, and the axis of the second servo motor 32, which is shown extending in a direction perpendicular to the drawing sheet of FIG. 5, is parallel to the surface of the marble platform 8. Here, in the positioning method for the positioning device of Embodiment 1, the planar Cartesian coordinate system is constructed from the surface of the marble platform 8, and it is worth noting here that the laser projector 1 may be opposed to one of the vertex angles of the marble platform 8, and the vertex angle is used as the origin of coordinates of the Cartesian coordinate system. The origin can serve as the initialization position of the laser projector 1, and the computer 5 and the servo driver 4 can be arranged outside the warehouse 7.

Figure 6:
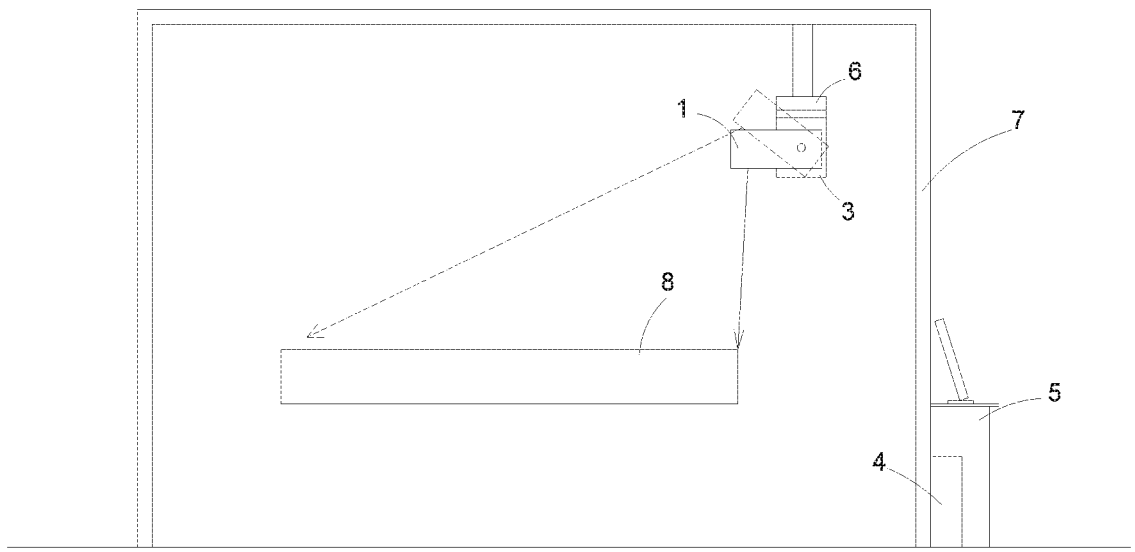
FIG. 6 is a schematic structural diagram of the second positioning device of the present disclosure installed in a color film coating machine.

As shown in FIG. 6, the second color film coating machine of the present disclosure includes a warehouse 7, a marble platform 8 arranged in the warehouse 7, and a positioning device in Embodiment 2, the laser projector 1 is arranged on the inner top of the warehouse 7, the linear motor 6 is fixed on the inner top of the warehouse 7 through a bracket, the laser projector 1 is fixed on the output shaft of the servo motor 3, the projection direction of the laser projector 1 is opposite to the surface of the marble platform 8, the linear motor 6 is parallel to the surface of the marble platform 8, and the axis of the servo motor 3 is parallel to the surface of the marble platform. Here, in the positioning method for the positioning device of Embodiment 2, the planar Cartesian coordinate system is constructed from the surface of the marble platform 8. It is worth noting here that the laser projector 1 may be opposite to one of the vertex angles of the marble platform 8, and the vertex angle is used as the origin of coordinates of the Cartesian coordinate system. The origin can serve as the initialization position of the laser projector 1, and the computer 5 and the servo driver 4 can be arranged outside the warehouse 7.

In the present disclosure, the laser projector 1, the servo driver 4 and the computer 5 are also connected to a power source. The laser projector 1 may be controlled by the computer 5, or may be turned on by setting a manual switch, which is not limited herein.

In the present disclosure, the prior art is used for controlling and calculating the linear motor and the servo motor of the servo driver, and the present disclosure is not limited thereto, and only needs to be able to realize the above functions.

In the case of known coordinates, the present disclosure starts the positioning device by inputting the coordinate value to the computer to be converted by the servo drive to a corresponding angle or position, with which the servo motor or linear motor starts from an initialization position to the target position, to achieve precise positioning, allowing production problems to be quickly handled and resolved, to thereby enhance the production rate of production lines and timely stop undesired production of bad products and therefore improving product quality and yield. In case that a foreign object, which is regarded as a target foreign object, is presented at a site on a target plane, which is for example the surface of the marble platform, an operator manually turns the device to have the laser cast to the target position, presses a coordinate reading button, and then, the servo system resets so as to control the computer to determine, through calculation performed on a rotation angle of the servo system during the process of resetting, the coordinates of the target foreign object to realize a function of accurate coordinate acquirement.

The positioning device of the present disclosure can be applied to a macroscopic inspection machine in addition to a color film coating machine.

Although the disclosure has been shown and described with reference to specific embodiments, it will be understood by those skilled in the art that various changes in form and details may be made therein without departing from the spirit and scope of the disclosure as defined by the appended claims and their equivalents.

What is claimed is:

1. A positioning device, comprising a laser projector and a servo system that is fixedly mounted and is operable to drive the laser projector to move a laser projection point cast on a fixed surface, wherein the servo system is operable in a non-Cartesian coordinate system that includes at least one angular coordinate and the fixed surface is defined in a planar Cartesian coordinate system;

wherein a computer is connected to the servo system and is operable to determine a first coordinate of the laser projection point in the non-Cartesian coordinate system according to the movement of the servo system and a second coordinate of the laser projection point in the planar Cartesian coordinate system is determined according to the first coordinate of the laser projection point in the non-Cartesian coordinate system.

2. The positioning device according to claim 1, wherein the servo system comprises at least two servo motors that drive the laser projector to rotate in a spherical coordinate system that defines the non-Cartesian coordinate system and a servo driver connected with the servo motors for controlling rotation angles of the servo motors, wherein the two servo motors comprises a first servo motor that drives the laser projector for rotating in a first plane and a second servo motor that drives the laser projector for rotating in a second plane that is different from the first plane, the second servo motor being fixed on an output shaft of the first servo motor, the laser projector being fixed on the output shaft of the second servo motor.

3. The positioning device according to claim 1, wherein the servo system comprises a servo motor that drives the laser projector to rotate in a plane, a linear motor that drives the laser projector to move in a direction, and a servo driver connected to the servo motor and the linear motor, wherein the servo driver is configured to controlling a rotation angle of the servo motor and a moving distance of the linear motor, the servo motor being fixed on the linear motor, an axis of the servo motor being parallel to the linear motor, the laser projector being fixed on an output shaft of the servo motor.

4. A positioning method, comprising a laser projector, wherein the positioning method comprises:
    establishing a spherical coordinate system in which a laser projection point of the laser projector is movable;
    establishing a planar Cartesian coordinate system on a fixed surface onto which the laser projection point of the laser projector is cast;
    making an origin of the spherical coordinate system corresponding to an origin of the planar Cartesian coordinate system, wherein coordinates of the spherical coordinate system and coordinates of the planar Cartesian coordinate system correspond to each other in a one-to-one manner;
    acquiring a spherical coordinate of the laser projection point of the laser projector that is determined according to the movement of the laser projection point in the spherical coordinate system and converting the spherical coordinate of the laser projection point in the spherical coordinate system to a Cartesian coordinate in the Cartesian coordinate system so as to determine a Cartesian coordinate of the laser projection point of the laser projector on the fixed surface, so as to obtain a coordinate in the planar Cartesian coordinate system for a site where the projection point of the laser projector is located on the fixed surface.

5. A machine, comprising a warehouse and a marble platform arranged in the warehouse, and further comprising a positioning device, wherein the positioning device comprises a laser projector and a servo system that is fixedly mounted and is operable to drive the laser projector to move a laser projection point cast on a fixed surface of the marble platform, wherein the servo system is operable in a non-Cartesian coordinate system that includes at least one angular coordinate and the fixed surface is defined in a planar Cartesian coordinate system; and the laser projector is arranged on an inner top of the warehouse, and a projection direction of the laser projector is opposite to the fixed surface of the marble platform;
    wherein a computer is connected to the servo system and is operable to determine a first coordinate of the laser projection point in the non-Cartesian coordinate system according to the movement of the servo system and a second coordinate of the laser projection point in the planar Cartesian coordinate system is determined according to the first coordinate of the laser projection point in the non-Cartesian coordinate system.

6. The machine according to claim 5, wherein the servo system comprises at least two servo motors that drive the laser projector to rotate in a spherical coordinate system that defines the non-Cartesian coordinate system and a servo driver connected with the servo motors for controlling rotation angles of the servo motors, wherein the two servo motors comprises a first servo motor that drives the laser projector for rotating in a first plane and a second servo motor that drives the laser projector for rotating in a second plane that is different from the first plane, the second servo motor being fixed on an output shaft of the first servo motor, the first servo motor being fixed on the inner top of the warehouse by a bracket, the laser projector being fixed on the output shaft of the second servo motor.

7. The machine according to claim 5, wherein the servo system comprises a servo motor that drives the laser projector to rotate in a first predetermined direction, a linear motor that drives the laser projector to move in a second predetermined direction, and a servo driver connected to the servo motor and the linear motor, wherein the servo driver is configured to controlling a rotation angle of the servo motor and a moving distance of the linear motor, the servo motor being fixed on the linear motor, an axis of the servo motor being parallel to the linear motor, the laser projector being fixed on an output shaft of the servo motor.

* * * * *